United States Patent
Xu

(10) Patent No.: US 12,483,109 B2
(45) Date of Patent: Nov. 25, 2025

(54) CURRENT SENSING APPARATUS AND CONTROL METHOD

(71) Applicant: LEN TECH Inc., Plano, TX (US)

(72) Inventor: Gonggui Xu, Plano, TX (US)

(73) Assignee: LEN TECH Inc., Plano, TX (US)

( * ) Notice: Subject to any disclaimer, the term of this patent is extended or adjusted under 35 U.S.C. 154(b) by 252 days.

(21) Appl. No.: 18/379,566

(22) Filed: Oct. 12, 2023

(65) Prior Publication Data

US 2025/0125704 A1    Apr. 17, 2025

(51) Int. Cl.
*H02M 1/00*    (2007.01)
*H02M 3/158*    (2006.01)

(52) U.S. Cl.
CPC .......... *H02M 1/0009* (2021.05); *H02M 3/158* (2013.01)

(58) Field of Classification Search
CPC .............................. H02M 3/158; H02M 1/0009
See application file for complete search history.

(56) References Cited

U.S. PATENT DOCUMENTS

| | | | | |
|---|---|---|---|---|
| 11,870,348 B1* | 1/2024 | Gaddam | | H02M 3/158 |
| 2013/0063113 A1* | 3/2013 | Couleur | | H02M 3/1588 |
| | | | | 323/282 |
| 2013/0271216 A1* | 10/2013 | Liu | | H03F 1/26 |
| | | | | 330/254 |
| 2014/0347078 A1* | 11/2014 | Qin | | G01R 19/0092 |
| | | | | 324/713 |
| 2018/0358898 A1* | 12/2018 | Yamaguchi | | G05F 1/461 |
| 2022/0271664 A1* | 8/2022 | Jaladanki | | H02M 3/158 |

* cited by examiner

*Primary Examiner* — Rafael O Leon De Domenech
(74) *Attorney, Agent, or Firm* — AP3 Law Firm PLLC

(57) ABSTRACT

An apparatus includes a current sensing gain stage comprising a first leg and a second leg, wherein each leg comprises a plurality of transistors connected in series, a first track stage configured to receive a first current sensing signal, wherein the first track stage comprises a first bias transistor configured to provide a first range of headroom for the first leg of the current sensing gain stage, and a second track stage configured to receive a second current sensing signal, wherein the second track stage comprises a second bias transistor configured to provide a second range of headroom for the second leg of the current sensing gain stage.

20 Claims, 4 Drawing Sheets

CURRENT SENSING APPARATUS AND CONTROL METHOD

TECHNICAL FIELD

The present invention relates to a current sensing apparatus and control method, and, in particular embodiments, to a current sensing apparatus for a power converter having a wide input voltage range.

BACKGROUND

As technologies further advance, a variety of processors such as Digital Signal Processors (DSPs), Field Programmable Gate Arrays (FPGAs), Central Processing Units (CPUs) and/or the like, have become popular. Each processor operates with a low supply voltage (e.g., sub-1V) and consumes a large amount of current. Meanwhile, the input voltage bus has stayed the same (e.g., 12 V) or increased to a higher level (e.g., 48 V) depending on different applications or design needs.

In a high voltage application where a low output voltage is required, two power stages connected in cascaded are traditionally employed to covert the high input voltage into a suitable low voltage fed into the processor. However, this power architecture increases the system cost and complexity.

In order to reduce the system cost and complexity, a load in the high voltage application may be powered by a power converter. The power converter such as a buck converter includes two power switches connected in series. A first power switch not connected to ground is referred to as a high-side switch. A second power switch connected to ground is referred to as low-side switch. A common node of the high-side switch and the low-side switch is a switching node of the power converter. A low-side gate drive circuit and a high-side gate drive circuit are employed to control the gates of the low-side switch and the high-side switch, respectively.

The low-side switch and the high-side switch may be implemented as metal oxide semiconductor field effect transistors (MOSFET). MOSFETs are voltage-controlled devices. When a gate drive voltage is applied to the gate of a MOSFET, and the gate drive voltage is greater than the turn-on threshold of the MOSFET, a conductive channel is established between the drain and the source of the MOSFET. After the conductive channel has been established, the MOSFET is in an on state in which power flows between the drain and the source of the MOSFET. On the other hand, when the gate drive voltage applied to the gate is less than the turn-on threshold of the MOSFET, the MOSFET is turned off accordingly.

As power consumption has become more important, there may be a need for accurately monitoring and/or controlling the current flowing through the power converter so as to achieve a high-efficiency, safe and reliable operation of the power converter. Current sense devices such as current sense resistors have become the preferred choice for achieving high performance (e.g., accurate current measurement information) because current sense resistors can be connected in series with the inductor of the power converter. However, as the input voltage of the power converter varies in a wide range (e.g., from 0 V to 60 V), the silicon area occupied by the current sensing apparatus has become a significant issue, which presents challenges to designers of wide input range power conversion systems. Furthermore, under the wide input voltage range, semiconductor fabrication variations may cause a variety of mismatches. These mismatches seriously degrade accuracy in current sensing. It would be desirable to have a current sense apparatus for use in wide input voltage range applications exhibiting good behaviors such as highly-accurate current sensing and low power consumption.

SUMMARY

These and other problems are generally solved or circumvented, and technical advantages are generally achieved, by preferred embodiments of the present disclosure which provide a current sensing apparatus for a power converter having a wide input voltage range.

In accordance with an embodiment, an apparatus comprises a current sensing gain stage comprising a first leg and a second leg, wherein each leg comprises a plurality of transistors connected in series, a first track stage configured to receive a first current sensing signal, wherein the first track stage comprises a first bias transistor configured to provide a first range of headroom for the first leg of the current sensing gain stage, and a second track stage configured to receive a second current sensing signal, wherein the second track stage comprises a second bias transistor configured to provide a second range of headroom for the second leg of the current sensing gain stage.

In accordance with another embodiment, a method comprises configuring a power converter to operate in a wide range from a first voltage level to a second voltage level, configuring a gain stage of a current sensing apparatus to operate in the wide range from the first voltage level to the second voltage level, in response to operating the gain stage at the first voltage level, configuring a first auxiliary bias stage and a second auxiliary bias stage to provide low voltage bias currents for the gain stage, and in response to operating the gain stage at the second voltage level, configuring the first auxiliary bias stage and the second auxiliary bias stage to provide high voltage bias currents for the gain stage.

In accordance with yet another embodiment, a power converter comprises a first power switch and a second power switch connected in series between an input voltage bus and ground, an inductor connected between a common node of the first power switch and the second power switch and a first terminal of a current sense device, a capacitor connected between a second terminal of the current sense device and ground, and a current sensing apparatus having a first input connected to the first terminal of the current sense device and a second input connected to the second terminal of the current sense device, wherein the current sensing apparatus comprises a current sensing gain stage comprising a first leg and a second leg, wherein each leg comprises a plurality of transistors connected in series, a first track stage configured to receive a first current sensing signal tapped at the first terminal of the current sense device, wherein the first track stage comprises a first bias transistor configured to provide a first range of headroom for the first leg, and a second track stage configured to receive a second current sensing signal tapped at the second terminal of the current sense device, wherein the second track stage comprises a second bias transistor configured to provide a second range of headroom for the second leg.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a current sensing apparatus for a power converter having a wide input voltage range. The disclosure may also be applied, however, to a variety of power converters. Hereinafter, various embodiments will be explained in detail with reference to the accompanying drawings.

Figure 1:
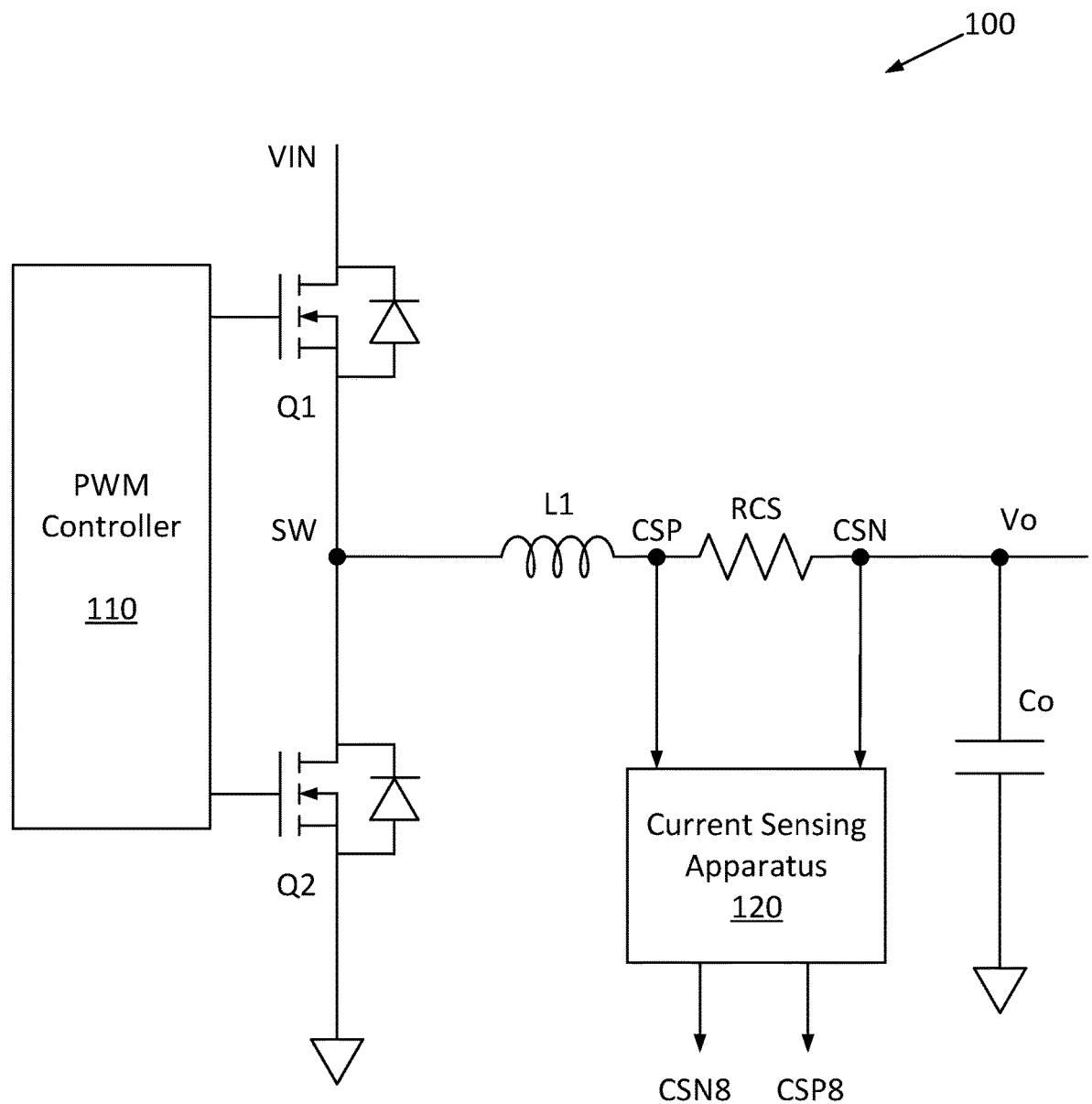
FIG. 1 illustrates a schematic diagram of a power converter and the associated control circuit in accordance with various embodiments of the present disclosure.

FIG. 1 illustrates a schematic diagram of a power converter and the associated control circuit in accordance with various embodiments of the present disclosure. The power converter 100 is a step-down power converter. The power converter 100 is also known as a buck converter. As shown in FIG. 1, the power converter 100 comprises a first power switch Q1, a second power switch Q2, an inductor L1, a current sense device RCS and an output capacitor Co. In some embodiments, the current sense device RCS is implemented as a current sense resistor coupled between the inductor L1 and the output terminal of the power converter 100.

As shown in FIG. 1, the first power switch Q1 and the second power switch Q2 are connected in series between an input voltage bus VIN and ground. The common node of the first power switch Q1 and the second power switch Q2 is a switching node (SW). The inductor L1 is connected between the common node of the first power switch Q1 and the second power switch Q2, and a first terminal of the current sense device RCS. The output capacitor Co is connected between a second terminal of the current sense device RCS and ground.

The control circuit of the power converter 100 comprises a PWM controller 110 and a current sensing apparatus 120. The current sensing apparatus 120 is implemented as a wide range current sensing amplifier. As shown in FIG. 1, a first input of the current sensing apparatus 120 is connected to the first terminal of the current sense device RCS. A second input of the current sensing apparatus 120 is connected to the second terminal of the current sense device RCS. Throughout the description, the first terminal of the current sense device RCS is alternatively referred to as a CSP node. The second terminal of the current sense device RCS is alternatively referred to as a CSN node.

In operation, based on the current sense signals tapped at the CSP node and the CSN node, the current sensing apparatus 120 outputs sensed current signals CSN8 and CSP8. The PWM controller 110 is configured to receive a plurality of operating parameters including the sensed current signals CSN8, CSP8, a predetermined reference signal, an error amplifier output signal and the like. Based on the received signals, the PWM controller 110 is configured to generate gate drive voltages for switches Q1 and Q2.

In operation, the power converter 100 operates in a wide input voltage range. In some embodiments, the input voltage range is from 0 V to 60 V. The PWM controller 110 is able to generate a gate drive signal having a duty cycle up to 100%. As a result, the output voltage of the power converter 100 is in a range from 0 V to about 60 V.

It should be noted that the upper limit of the input voltage (e.g., 60 V) used in the previous example is selected purely for demonstration purposes and are not intended to limit the various embodiments of the present invention to any particular upper limit.

The current sensing apparatus 120 comprises a gain stage, a bias stage, a first track stage, a second track stage, a first auxiliary bias stage and a second auxiliary bias stage. In operation, the power converter 100 is configured to operate in an input voltage ranging from 0 V to 60 V. In response to this wide input voltage range, the current sensing apparatus 120 is configured to operate at a low voltage level (e.g., about 0 V) through enabling low voltage bias currents of the first auxiliary bias stage and the second auxiliary bias stage. The low voltage bias currents of the first auxiliary bias stage and the second auxiliary bias stage are able to establish adequate bias voltages for the gain stage. On the other hand, the current sensing apparatus 120 is configured to operate at a high voltage level (e.g., about 60 V) through enabling high voltage bias currents of the first auxiliary bias stage and the second auxiliary bias stage. The high voltage bias currents of the first auxiliary bias stage and the second auxiliary bias stage are able to establish adequate bias voltages for the gain stage. The operating principle of the current sensing apparatus 120 will be discussed in detail below with respect to FIG. 3.

Figure 2:
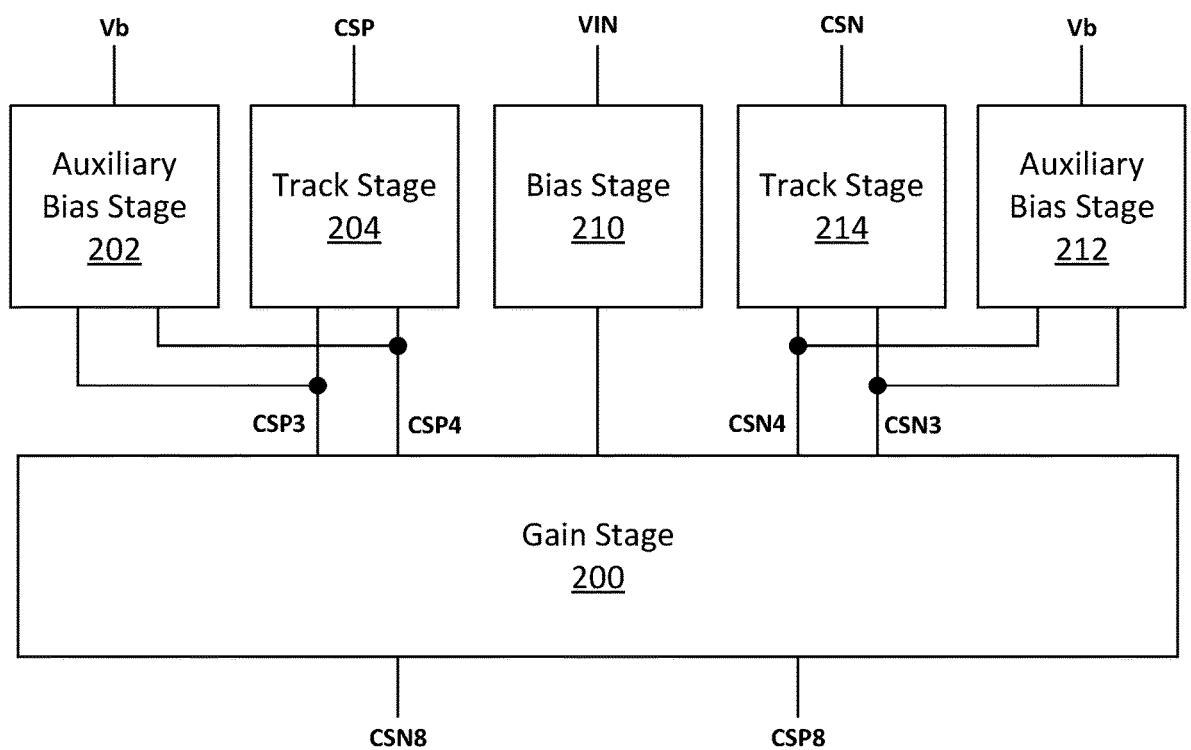
FIG. 2 illustrates a block diagram of the current sensing apparatus shown in FIG. 1 in accordance with various embodiments of the present disclosure.

FIG. 2 illustrates a block diagram of the current sensing apparatus shown in FIG. 1 in accordance with various embodiments of the present disclosure. The current sensing apparatus 120 comprises a gain stage 200, a bias stage 210, a first track stage 204, a second track stage 214, a first auxiliary stage 202 and a second auxiliary stage 212.

As shown in FIG. 2, the bias stage 210 is connected between VIN and the gain stage 200. The first track stage 204 is connected to the CSP node. The outputs of the first track stage 204 are connected to CSP3 and CSP4 nodes of the gain stage 200. The first auxiliary bias stage 202 is connected to a bias voltage Vb. The outputs of the first auxiliary bias stage 202 are connected to the CSP3 and CSP4 nodes of the gain stage 200. The second track stage 214 is connected to the CSN node. The outputs of the second track stage 214 are connected to CSN3 and CSN4 nodes of the gain stage 200. The second auxiliary bias stage 212 is connected to the bias voltage Vb. The outputs of the second auxiliary bias stage 212 are connected to the CSP3 and CSP4 nodes of the gain stage 200.

In some embodiments, the gain stage 200 of the current sensing apparatus 120 comprises a first leg and a second leg, each of which comprises a plurality of transistors connected in series. The first track stage 204 is configured to receive a first current sensing signal tapped at the CSP node. The first track stage comprises a first bias transistor configured to provide a first range of headroom for the first leg. The second track stage 214 is configured to receive a second current sensing signal tapped at the CSN node. The second track stage 214 comprises a second bias transistor configured to provide a second range of headroom for the second leg.

In operation, when the voltage on a current sensing node (e.g., CSN node) is close to a voltage potential on a ground rail (e.g., 0 V), the first auxiliary bias stage 202 is configured to provide a first low voltage bias current for the first leg of the gain stage 200, and the second auxiliary bias stage 212 is configured to provide a second low voltage bias current for the second leg of the gain stage 200. The first low voltage bias current is employed to establish a first bias voltage so that the transistors of the first leg of the gain stage have enough operating headroom. Likewise, the second low voltage bias current is employed to establish a second bias voltage so that the transistors of the second leg of the gain stage have enough operating headroom.

In operation, when the voltage on a current sensing node (e.g., CSN node) is close to a voltage potential on a power rail (e.g., 60 V), the first auxiliary bias stage 202 is configured to provide a first high voltage bias current for the first leg of the gain stage 200, and the second auxiliary bias stage 212 is configured to provide a second high voltage bias current for the second leg of the gain stage 200. The first high voltage bias current is employed to establish a third bias voltage so that the transistors of the first leg of the gain stage have enough operating headroom. Likewise, the second high voltage bias current is employed to establish a fourth bias voltage so that the transistors of the second leg of the gain stage have enough operating headroom.

Figure 3:
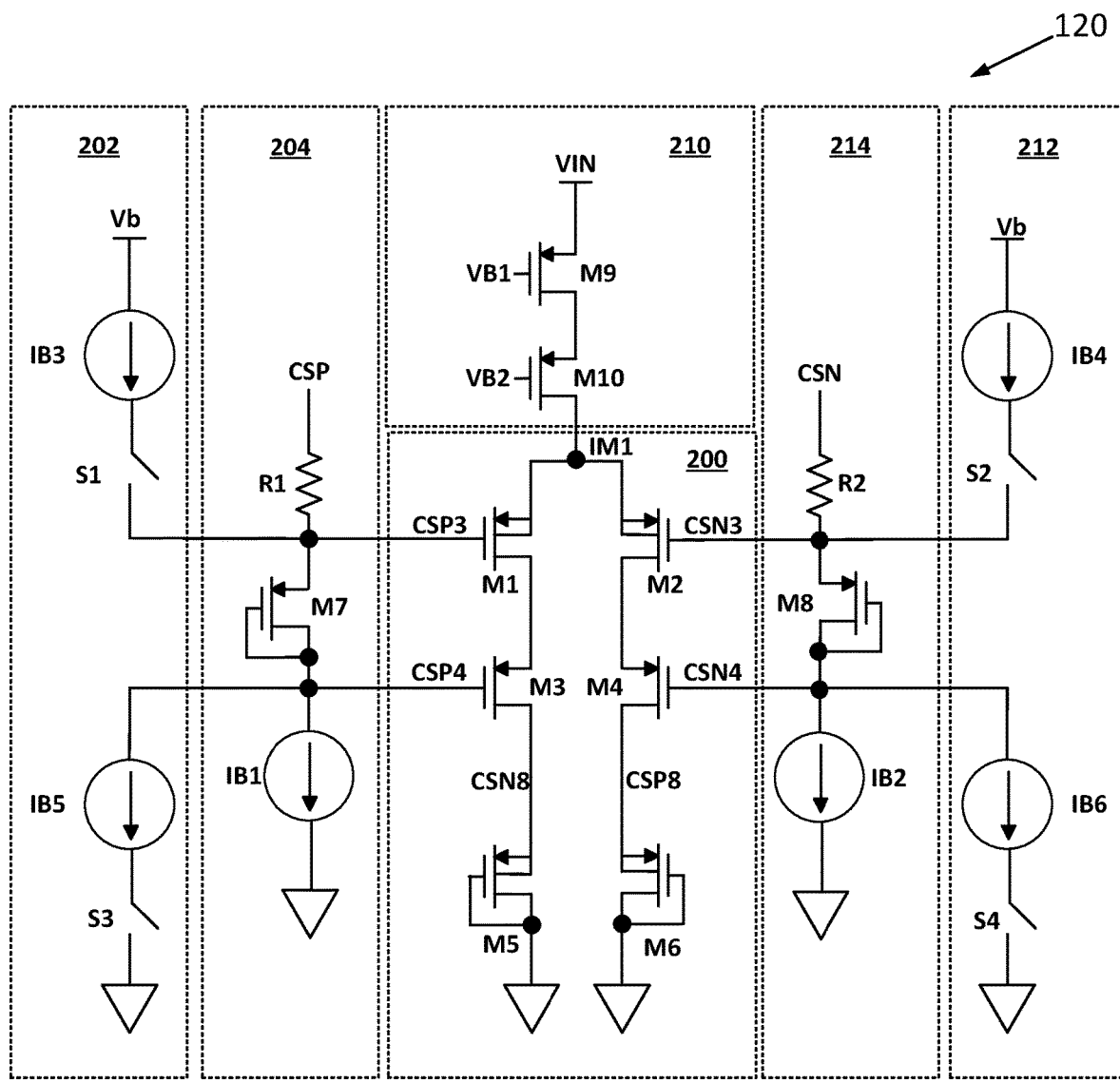
FIG. 3 illustrates a schematic diagram of the current sensing apparatus shown in FIG. 2 in accordance with various embodiments of the present disclosure.

FIG. 3 illustrates a schematic diagram of the current sensing apparatus shown in FIG. 2 in accordance with various embodiments of the present disclosure. The current sensing apparatus 120 comprises a gain stage 200, a bias stage 210, a first track stage 204, a second track stage 214, a first auxiliary stage 202 and a second auxiliary stage 212.

As shown in FIG. 3, the gain stage 200 comprises a first leg and a second leg. The first leg of the gain stage 200 comprises a first transistor M1, a third transistor M3 and a fifth transistor M5 connected in series between an intermediate node IM1 and ground. As shown in FIG. 3, a bulk terminal and a source of the first transistor M1 are connected together. A bulk terminal and a source of the fifth transistor M5 are connected together. A gate and a drain of the fifth transistor M5 are connected together. In operation, when the gain stage 200 undergoes amplification, the gain provided by the first transistor M1 is three times greater than the gain provided by the fifth transistor M5. The third transistor M3 functions as a buffer configured to provide high voltage isolation to protect the fifth transistor M5 from being damaged.

As shown in FIG. 3, the second leg of the gain stage 200 comprises a second transistor M2, a fourth transistor M4 and a sixth transistor M6 connected in series between the intermediate node IM1 and ground. As shown in FIG. 3, a bulk terminal and a source of the second transistor M2 are connected together. A bulk terminal and a source of the sixth transistor M6 are connected together. A gate and a drain of the sixth transistor M6 are connected together. In operation, when the gain stage 200 undergoes amplification, the gain provided by the second transistor M2 is three times greater than the gain provided by the sixth transistor M6. The fourth transistor M4 functions as a buffer configured to provide high voltage isolation to protect the sixth transistor M6 from being damaged.

The bias stage 210 comprises a ninth transistor M9 and the tenth transistor M10 connected in series between the input voltage VIN of the power converter 100 and the first intermediate node IM1. As shown in FIG. 3, the gate of M9 is connected to a first predetermined bias voltage VB1. The gate of M10 is connected to a second predetermined bias voltage VB2. The tenth transistor M10 is a high voltage transistor configured to provide isolation between the input voltage of the power converter, and the first current sensing node CSP and the second current sensing node CSN.

In some embodiments, transistors M1, M2, M5, M6 and M9 are low voltage switches. Transistors M3, M4 and M10 are high voltage switches. In some embodiments, the voltage rating of transistors M1, M2, M5, M6 and M9 is about 6 V. The voltage rating of transistors M3, M4 and M10 is about 60 V. The voltage rating of the high voltage switches (e.g., M10) is about ten times greater than that of the low voltage switches (e.g., M9).

In operation, the tenth transistor M10 is employed to provide isolation between the input voltage VIN of the power converter 100 and the CSP and CSN nodes. The third transistor M3 and the fourth transistor M4 are employed to provide isolation between high voltage nodes (e.g., CSP and CSN) and low voltage devices (e.g., M5 and M6).

The first track stage 204 comprises a first resistor R1, a seventh transistor M7 and a first current source IB1 connected in series between a first current sensing node CSP and ground. Referring back to FIG. 1, the CSP node is a common node of the inductor L1 and the current sense device RCS. As shown in FIG. 3, a common node of the first resistor R1 and the seventh transistor M7 is connected to a gate of the first transistor M1. The common node of the first resistor R1 and the seventh transistor M7 is denoted as CSP3 as shown in FIG. 3. A common node of the seventh transistor M7 and the first current source IB1 is connected to a gate of the third transistor M3. The common node of the seventh transistor M7 and the first current source IB1 is denoted as CSP4 as shown in FIG. 3. A drain and a gate of the seventh transistor M7 are connected together. In operation, the seventh transistor M7 functions as a first bias transistor configured to provide the operating headroom for the third transistor M3.

The second track stage 214 comprises a second resistor R2, an eighth transistor M8 and a second current source IB2 connected in series between a second current sensing node CSN and ground. Referring back to FIG. 1, the CSN node is a common node of the current sense device RCS and the output capacitor Co of the power converter 100. As shown in FIG. 3, a common node of the second resistor R2 and the eighth transistor M8 is connected to a gate of the second transistor M2. The common node of the second resistor R2 and the eighth transistor M8 is denoted as CSN3 as shown in FIG. 3. A common node of the eighth transistor M8 and the second current source IB2 is connected to a gate of the fourth transistor M4. The common node of the eighth transistor M8 and the second current source IB2 is denoted as CSN4 as shown in FIG. 3. A drain and a gate of the eighth transistor M8 are connected together. In operation, the eighth transistor M8 functions as a second bias transistor configured to provide the operating headroom for the fourth transistor M4.

In some embodiments, the current provided by the first current source IB1 is equal to the current provided by the second current source IB2. The current flowing through IB1 is about 1 microampere. R1 is a 10 k ohm resistor. R2 is a 10 k ohm resistor.

In operation, the current sensing apparatus 120 is able to operate in a wide range from a low voltage (e.g., 0 V) to a high voltage (e.g., 60 V). The current sensing apparatus 120 is dynamically biased by the voltages on the CSP and CSN nodes. The voltage on the CSP node provides the range of headroom available for M1. Likewise, voltage on the CSN node provides the range of headroom available for M2. The gate-to-source voltage of M7 provides the range of headroom available for M3, and gate-to-source voltage of M8 provides the range of headroom available for M4.

One advantageous feature of having M7 and M8 is that the current sensing accuracy can be significantly improved. In particular, the operating headroom for M3 and M4 is not related to the currents flowing through IB1 and IB2. As such, the currents flowing through IB1 and IB2 can be a small current such as 1 microampere. Under this small current, the voltages across R1 and R2 are about 10 millivolts. The semiconductor fabrication process may cause a 1% mismatch between the values of R1 and R2. The corresponding voltage mismatch is only about 0.1 millivolts. Such a small voltage mismatch provides an acceptable degree of current sensing accuracy. In some embodiments, by using M7 and M8, the current sensing accuracy error can be reduced from about 20% to about 3%.

In operation, when the current sensing apparatus 120 of the power converter 100 operates at a high voltage (e.g., about 60 V) or a low voltage (e.g., about 0 V), the first auxiliary bias stage 202 and the second auxiliary bias stage 212 are enabled to provide extra bias currents.

As shown in FIG. 3, the first auxiliary bias stage 202 comprises a low voltage bias current portion and a high voltage bias current portion. The low voltage bias current portion comprises a third current source IB3 and a first switch S1 connected in series between a bias voltage Vb and a gate of the first transistor M1. The high voltage bias current portion comprises a fifth current source IB5 and a third switch S3 connected in series between a gate of the third transistor M3 and ground. In some embodiments, the current flowing through the third current source IB3 is about 120 microamperes. The current flowing through the fifth current source IB5 is about 120 microamperes.

The second auxiliary bias stage 212 comprises a low voltage bias current portion and a high voltage bias current portion. The low voltage bias current portion comprises a fourth current source IB4 and a second switch S2 connected in series between the bias voltage Vb and a gate of the second transistor M2. The high voltage bias current portion comprises a sixth current source IB6 and a fourth switch S4 connected in series between a gate of the fourth transistor M4 and ground. In some embodiments, the current flowing through the fourth current source IB4 is about 120 microamperes. The current flowing through the sixth current source IB6 is about 120 microamperes.

In operation, in response to a voltage on the second current sensing node CSN approximately equal to a voltage on the ground rail (e.g., 0 V), the first switch S1 and the second switch S2 are configured to be turned on, and the third switch S3 and the fourth switch S4 are configured to be turned off. Once S1 is turned on, the current flowing through R1 establishes a bias voltage approximately equal to R1×IB3 (10K×120 uA), which is about 1.2 V. This bias voltage is able to provide enough operating headroom for the first transistor M1. Likewise, once S2 is turned on, the current flowing through R2 establishes a bias voltage approximately equal to R2×IB4 (10K×120 uA), which is about 1.2 V. This bias voltage is able to provide enough operating headroom for the second transistor M2.

In operation, in response to a voltage on the second current sensing node CSN approximately equal to a voltage on the power rail (e.g., 60 V), the first switch S1 and the second switch S2 are configured to be turned off, and the third switch S3 and the fourth switch S4 are configured to be turned on. Once S3 is turned on, the current flowing through R1 establishes a bias voltage approximately equal to R1×IB5 (10K×120 uA), which is about 1.2 V. This bias voltage is able to provide enough operating headroom for the first transistor M1. Likewise, once S4 is turned on, the current flowing through R2 establishes a bias voltage approximately equal to R2×IB6 (10K×120 uA), which is about 1.2 V. This bias voltage is able to provide enough operating headroom for the second transistor M2.

In operation, S1 and S2 may be controlled by a first comparator. The first comparator has a first input configured to receive a voltage signal proportional to the voltage on the second current sensing node CSN, a second input configured to receive a predetermined first voltage threshold approximately equal to a ground voltage potential (e.g., 0 V), and an output configured to generate a first control signal for controlling the first switch S1 and the second switch S2.

In operation, S3 and S4 may be controlled by a second comparator. The second comparator has a first input configured to receive the voltage signal proportional to the voltage on the second current sensing node CSN, a second input configured to receive a predetermined second voltage threshold proportional to an input voltage potential (e.g., 60 V) minus 1.2 V, and an output configured to generate a second control signal for controlling the third switch S3 and the fourth switch S4.

Figure 4:
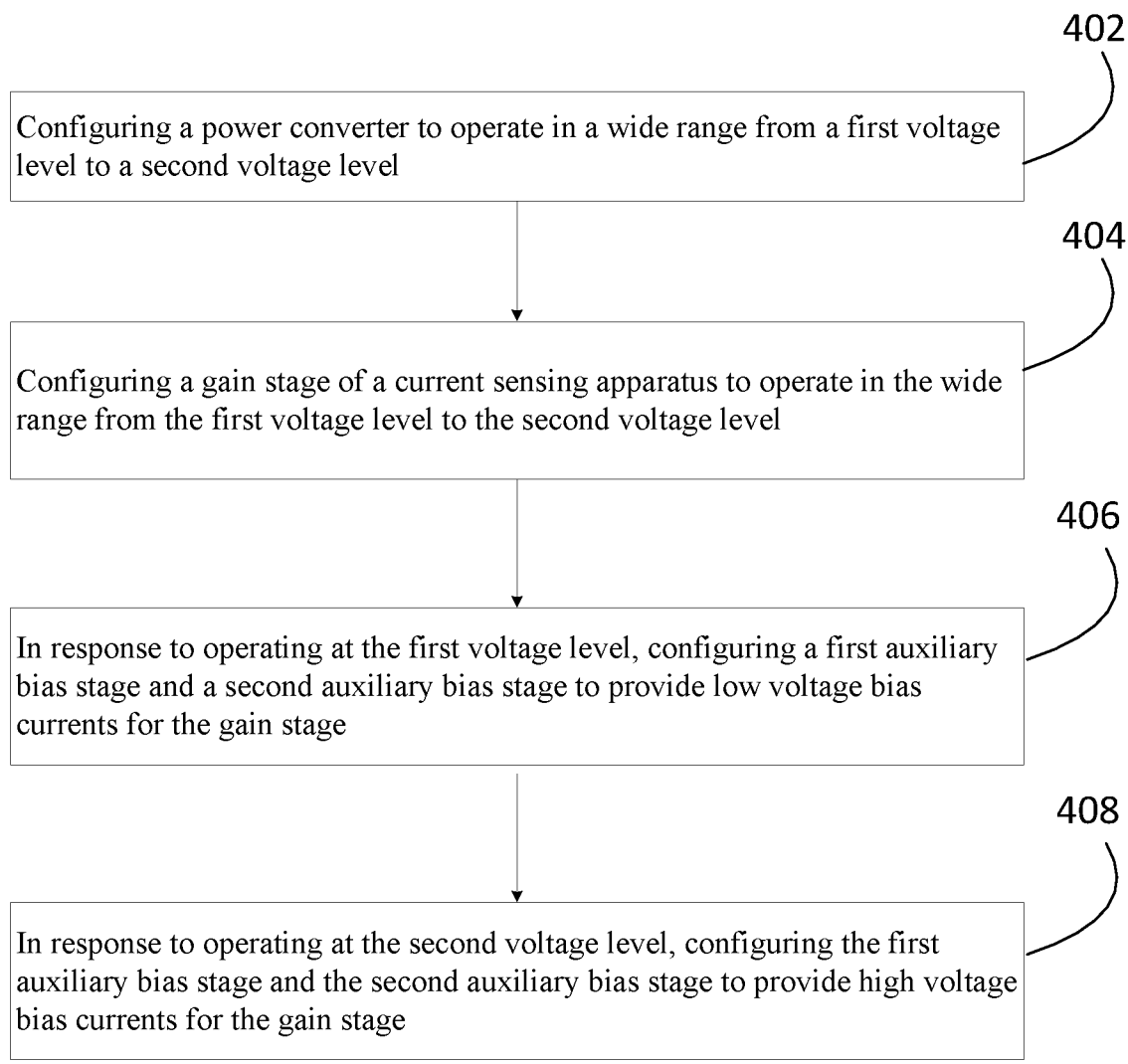
FIG. 4 illustrates a flow chart of controlling and operating the current sensing apparatus shown in FIG. 1 in accordance with various embodiments of the present disclosure.

FIG. 4 illustrates a flow chart of controlling and operating the current sensing apparatus shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

Referring back to FIG. 1, a current sensing apparatus is configured to receive detected voltages on the CSP and CSN nodes. The current sensing apparatus is configured to generate sensed current signals CSP8 and CSN8 based on the detected voltages. The sensed current signals and other operating parameters are fed into a PWM controller where gate drive signals are generated to control the on and off of the power switches Q1 and Q2.

Referring back to FIG. 2, the current sensing apparatus comprises a gain stage, a bias stage, a first track stage, a second track stage, a first auxiliary stage and a second auxiliary stage.

At step 402, a power converter is configured to operate in a wide range from a first voltage level to a second voltage level.

At step 404, a gain stage of a current sensing apparatus is configured to operate in the wide range from the first voltage level to the second voltage level.

At step 406, in response to operating the gain stage at the first voltage level, a first auxiliary bias stage and a second auxiliary bias stage are configured to provide low voltage bias currents for the gain stage.

At step 408, in response to operating the gain stage at the second voltage level, the first auxiliary bias stage and the second auxiliary bias stage are configured to provide high voltage bias currents for the gain stage.

Referring back to FIG. 3, the current sensing apparatus comprises the gain stage comprising a first transistor, a third transistor and a fifth transistor connected in series between an intermediate node and ground, and a second transistor, a fourth transistor and a sixth transistor connected in series between the intermediate node and ground, a first track stage comprising a first resistor, a seventh transistor and a first current source connected in series between a first current sensing node and ground, and wherein a common node of the first resistor and the seventh transistor is connected to a gate of the first transistor, and a common node of the seventh transistor and the first current source is connected to a gate of the third transistor, a second track stage comprising a second resistor, an eighth transistor and a second current source connected in series between a second current sensing node and ground, and wherein a common node of the second resistor and the eighth transistor is connected to a gate of the second transistor, and a common node of the eighth transistor and the second current source is connected to a gate of the fourth transistor, a bias stage comprising a ninth transistor and a tenth transistor connected in series between an input voltage of the power converter and the intermediate node, a first auxiliary bias stage comprising a third current source and a first switch connected in series between a bias voltage and the gate of the first transistor, and a third switch and a fifth current source connected in series between the gate of the third transistor and ground, and a second auxiliary bias stage comprising a fourth current source and a second switch connected in series between the bias voltage and the gate of the second transistor, and a fourth switch and a sixth current source connected in series between the gate of the fourth transistor and ground.

Referring back to FIGS. 1 and 3, the power converter comprises a first power switch and a second power switch connected in series between the input voltage of the power converter and ground, an inductor connected between a common node of the first power switch and the second power switch and a first terminal of a current sense device, and an output capacitor connected between a second terminal of the current sense device and ground. The first current sensing node is a common node of the inductor and the current sense device, and the second current sensing node is a common node of the current sense device and the output capacitor.

Referring back to FIG. 3, the method further comprises configuring the first transistor, the second transistor, the fifth transistor, the sixth transistor and the ninth transistor as low voltage devices, configuring the tenth transistor to provide isolation between the input voltage of the power converter, and the first current sensing node and the second current sensing node, and configuring the third transistor and the fourth transistor to provide isolation between the first current sensing node and the second current sensing node, and the fifth transistor and the sixth transistor.

Referring back to FIG. 3, the method further comprises configuring the seventh transistor to provide a first range of headroom for the third transistor, wherein a drain of the seventh transistor and a gate of the seventh transistor are connected together, and configuring the eighth transistor to provide a second range of headroom for the fourth transistor, wherein a drain of the eighth transistor and a gate of the eighth transistor are connected together.

Referring back to FIG. 3, the method further comprises in response to operating at the first voltage level, turning on the first switch and the second switch, and turning off the third switch and the fourth switch, wherein the first voltage level is approximately equal to zero, and in response to operating at the second voltage level, turning off the first switch and the second switch, and turning on the third switch and the fourth switch, wherein the second voltage level is approximately equal to the input voltage of the power converter.

Referring back to FIG. 3, as a result of turning on the first switch, a first extra bias current flows through the first resistor, and a voltage across the first resistor provides an adequate voltage for operating the first transistor, and as a result of turning on the second switch, a second extra bias current flows through the second resistor, and a voltage across the second resistor provides an adequate voltage for operating the second transistor.

Referring back to FIG. 3, as a result of turning on the third switch, a third extra bias current flows through the first resistor, and a voltage across the first resistor provides an adequate voltage for operating the first transistor, and as a result of turning on the fourth switch, a fourth extra bias current flows through the second resistor, and a voltage across the second resistor provides an adequate voltage for operating the second transistor.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
  a current sensing gain stage comprising a first leg and a second leg, wherein each leg comprises a plurality of transistors connected in series;
  a first track stage configured to receive a first current sensing signal, wherein the first track stage comprises a first bias transistor configured to provide a first range of headroom for the first leg of the current sensing gain stage; and a second track stage configured to receive a second current sensing signal, wherein the second track stage comprises a second bias transistor configured to provide a second range of headroom for the second leg of the current sensing gain stage.

2. The apparatus of claim 1, wherein:

the first leg of the current sensing gain stage comprises a first transistor, a third transistor and a fifth transistor connected in series between an intermediate node and ground;

the second leg of the current sensing gain stage comprises a second transistor, a fourth transistor and a sixth transistor connected in series between the intermediate node and ground;

the first track stage comprises a first resistor, a seventh transistor and a first current source connected in series between a first current sensing node and ground; and the second track stage comprises a second resistor, an eighth transistor and a second current source connected in series between a second current sensing node and ground.

3. The apparatus of claim 2, wherein:

a common node of the first resistor and the seventh transistor is connected to a gate of the first transistor;

a common node of the seventh transistor and the first current source is connected to a gate of the third transistor;

a common node of the second resistor and the eighth transistor is connected to a gate of the second transistor; and a common node of the eighth transistor and the second current source is connected to a gate of the fourth transistor.

4. The apparatus of claim 2, wherein:

a drain of the seventh transistor and a gate of the seventh transistor are connected together, and wherein the seventh transistor is the first bias transistor configured to provide the first range of headroom for the third transistor of the first leg; and a drain of the eighth transistor and a gate of the eighth transistor are connected together, and wherein the eighth transistor is the second bias transistor configured to provide the second range of headroom for the fourth transistor of the second leg.

5. The apparatus of claim 2, further comprising:

a bias stage comprising a ninth transistor and a tenth transistor connected in series between an input voltage of a power converter and the intermediate node.

6. The apparatus of claim 2, wherein:

a bulk terminal of the first transistor and a source of the first transistor are connected together;

a bulk terminal of the fifth transistor and a source of the fifth transistor are connected together;

a gate of the fifth transistor and a drain of the fifth transistor are connected together;

a bulk terminal of the second transistor and a source of the second transistor are connected together;

a bulk terminal of the sixth transistor and a source of the sixth transistor are connected together;

a gate of the sixth transistor and a drain of the sixth transistor are connected together.

7. The apparatus of claim 2, further comprising:

a first auxiliary bias stage comprising:

a third current source and a first switch connected in series between a bias voltage and a gate of the first transistor; and a fifth current source and a third switch connected in series between a gate of the third transistor and ground; and a second auxiliary bias stage comprising:

a fourth current source and a second switch connected in series between the bias voltage and a gate of the second transistor; and a sixth current source and a fourth switch connected in series between a gate of the fourth transistor and ground.

8. The apparatus of claim 7, wherein:

the first switch and the second switch are configured to be turned on, and the third switch and the fourth switch are configured to be turned off in response to a voltage on the second current sensing node approximately equal to zero; and the first switch and the second switch are configured to be turned off, and the third switch and the fourth switch are configured to be turned on in response to the voltage on the second current sensing node approximately equal to an input voltage of a power converter.

9. The apparatus of claim 8, further comprising:

a first comparator having a first input configured to receive a voltage signal proportional to the voltage on the second current sensing node, a second input configured to receive a predetermined first voltage threshold approximately equal to a ground voltage potential, and an output configured to generate a first control signal for controlling the first switch and the second switch; and a second comparator having a first input configured to receive the voltage signal proportional to the voltage on the second current sensing node, a second input configured to receive a predetermined second voltage threshold proportional to an input voltage potential of the power converter minus a threshold, and an output configured to generate a second control signal for controlling the third switch and the fourth switch.

10. A method comprising:

configuring a power converter to operate in a wide range from a first voltage level to a second voltage level;

configuring a gain stage of a current sensing apparatus to operate in the wide range from the first voltage level to the second voltage level;

in response to operating the gain stage at the first voltage level, configuring a first auxiliary bias stage and a second auxiliary bias stage to provide low voltage bias currents for the gain stage; and in response to operating the gain stage at the second voltage level, configuring the first auxiliary bias stage and the second auxiliary bias stage to provide high voltage bias currents for the gain stage.

11. The method of claim 10, wherein the current sensing apparatus comprises:

the gain stage comprising:

a first transistor, a third transistor and a fifth transistor connected in series between an intermediate node and ground; and a second transistor, a fourth transistor and a sixth transistor connected in series between the intermediate node and ground;

a first track stage comprising a first resistor, a seventh transistor and a first current source connected in series between a first current sensing node and ground, and wherein a common node of the first resistor and the seventh transistor is connected to a gate of the first transistor, and a common node of the seventh transistor and the first current source is connected to a gate of the third transistor;

a second track stage comprising a second resistor, an eighth transistor and a second current source connected in series between a second current sensing node and ground, and wherein a common node of the second resistor and the eighth transistor is connected to a gate of the second transistor, and a common node of the eighth transistor and the second current source is connected to a gate of the fourth transistor;

a bias stage comprising a ninth transistor and a tenth transistor connected in series between an input voltage of the power converter and the intermediate node;

a first auxiliary bias stage comprising:
 a third current source and a first switch connected in series between a bias voltage and the gate of the first transistor; and
 a third switch and a fifth current source connected in series between the gate of the third transistor and ground; and a second auxiliary bias stage comprising:
 a fourth current source and a second switch connected in series between the bias voltage and the gate of the second transistor; and
 a fourth switch and a sixth current source connected in series between the gate of the fourth transistor and ground.

12. The method of claim 11, wherein:
the power converter comprises:
 a first power switch and a second power switch connected in series between the input voltage of the power converter and ground;
 an inductor connected between a common node of the first power switch and the second power switch and a first terminal of a current sense device; and
 an output capacitor connected between a second terminal of the current sense device and ground;
the first current sensing node is a common node of the inductor and the current sense device; and
the second current sensing node is a common node of the current sense device and the output capacitor.

13. The method of claim 11, further comprising:
configuring the first transistor, the second transistor, the fifth transistor, the sixth transistor and the ninth transistor as low voltage devices;
configuring the tenth transistor to provide isolation between the input voltage of the power converter, and the first current sensing node and the second current sensing node; and
configuring the third transistor and the fourth transistor to provide isolation between the first current sensing node and the second current sensing node, and the fifth transistor and the sixth transistor.

14. The method of claim 11, further comprising:
configuring the seventh transistor to provide a first range of headroom for the third transistor, wherein a drain of the seventh transistor and a gate of the seventh transistor are connected together; and configuring the eighth transistor to provide a second range of headroom for the fourth transistor, wherein a drain of the eighth transistor and a gate of the eighth transistor are connected together.

15. The method of claim 11, further comprising:
in response to operating at the first voltage level, turning on the first switch and the second switch, and turning off the third switch and the fourth switch, wherein the first voltage level is approximately equal to zero; and
in response to operating at the second voltage level, turning off the first switch and the second switch, and turning on the third switch and the fourth switch, wherein the second voltage level is approximately equal to the input voltage of the power converter.

16. The method of claim 15, wherein:
as a result of turning on the first switch, a first extra bias current flows through the first resistor, and a voltage across the first resistor provides an adequate voltage for operating the first transistor; and
as a result of turning on the second switch, a second extra bias current flows through the second resistor, and a voltage across the second resistor provides an adequate voltage for operating the second transistor.

17. The method of claim 15, wherein:
as a result of turning on the third switch, a third extra bias current flows through the first resistor, and a voltage across the first resistor provides an adequate voltage for operating the first transistor; and
as a result of turning on the fourth switch, a fourth extra bias current flows through the second resistor, and a voltage across the second resistor provides an adequate voltage for operating the second transistor.

18. A power converter comprising:
a first power switch and a second power switch connected in series between an input voltage bus and ground;
an inductor connected between a common node of the first power switch and the second power switch and a first terminal of a current sense device;
a capacitor connected between a second terminal of the current sense device and ground; and
a current sensing apparatus having a first input connected to the first terminal of the current sense device and a second input connected to the second terminal of the current sense device, wherein the current sensing apparatus comprises:
 a current sensing gain stage comprising a first leg and a second leg, wherein each leg comprises a plurality of transistors connected in series;
 a first track stage configured to receive a first current sensing signal tapped at the first terminal of the current sense device, wherein the first track stage comprises a first bias transistor configured to provide a first range of headroom for the first leg; and
 a second track stage configured to receive a second current sensing signal tapped at the second terminal of the current sense device, wherein the second track stage comprises a second bias transistor configured to provide a second range of headroom for the second leg.

19. The power converter of claim 18, wherein:
the current sense device is a current sense resistor.

20. The power converter of claim 18, wherein the current sensing apparatus comprises:
the gain stage comprising:
 the first leg comprising a first transistor, a third transistor and a fifth transistor connected in series between an intermediate node and ground;

the second leg comprises a second transistor, a fourth transistor and a sixth transistor connected in series between the intermediate node and ground;

the first track stage comprises a first resistor, a seventh transistor and a first current source connected in series between a first current sensing node and ground, and wherein a common node of the first resistor and the seventh transistor is connected to a gate of the first transistor, and a common node of the seventh transistor and the first current source is connected to a gate of the third transistor; and the second track stage comprises a second resistor, an eighth transistor and a second current source connected in series between a second current sensing node and ground, and wherein a common node of the second resistor and the eighth transistor is connected to a gate of the second transistor, and a common node of the eighth transistor and the second current source is connected to a gate of the fourth transistor;

a bias stage comprising a ninth transistor and a tenth transistor connected in series between an input voltage of a power converter and the intermediate node;

a first auxiliary bias stage comprising:
  a third current source and a first switch connected in series between a bias voltage and a gate of the first transistor; and
  a third switch and a fifth current source connected in series between a gate of the third transistor and ground; and a second auxiliary bias stage comprising:
  a fourth current source and a second switch connected in series between the bias voltage and a gate of the second transistor; and
  a fourth switch and a sixth current source connected in series between a gate of the fourth transistor and ground.

* * * * *